Nov. 30, 1965 F. PAPKE 3,220,306
SLIDE PROJECTOR WITH ADJUSTABLE BUILT-IN FILTER
MEANS FOR CHANGING THE REPRODUCTION OF COLORS
Filed July 8, 1963
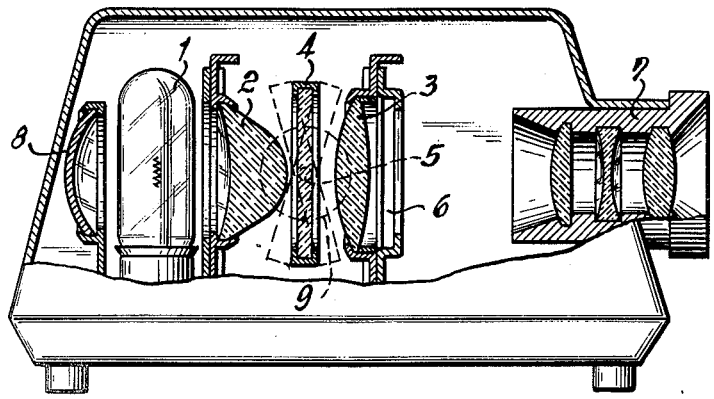

3,220,306
SLIDE PROJECTOR WITH ADJUSTABLE BUILT-IN FILTER MEANS FOR CHANGING THE REPRODUCTION OF COLORS
Friedrich Papke, Braunschweig, Germany, assignor to Voigtlander A.G., Braunschweig, Germany, a corporation of Germany
Filed July 8, 1963, Ser. No. 293,495
Claims priority, application Germany, July 7, 1962, V 22,758
7 Claims. (Cl. 88—24)

This invention relates to slide projectors and, more particularly, to a slide projector having built-in thereinto an adjustable filter means for changing the reproduction of colors.

The color quality projection of projectors, particularly slide projectors, sometimes varies greatly depending upon the slide, or film, being projected and upon the bulb used for illumination. Most viewers feel strongly that the light provided by low voltage projector bulbs having a high color temperature is "too cold," and therefore unpleasant. As the slides frequently have a blue cast, and as the commonly used heat filters partly suppress the long wave portions of the light, this "cold-light" effect is encountered frequently. In projectors provided with means for using interchangeably either low voltage projector lamp bulbs or standard projector lamp bulbs, the disturbing effect is particularly unpleasant when the projector operation is switched from a standard projector bulb to a low voltage projector bulb.

It is known to insert gray filters and colored filters into the light ray path through slide projectors, to change the brightness, the color, or both of the projected rays. By this means, it is possible to correct for slides which are too light, or which have the wrong colors, due to faulty exposure, so that the pictures projected using such slides will have essentially the same brightness as pictures projected using normally exposed slides and which are substantially corrected for color errors.

The filters used for this purpose are accessories which, when necessary, are inserted into the projector in the path of the light rays therethrough. This insertion of filters into a projector and removing filters from a projector, particularly where it is necessary frequently to interchange filters, to remove filters, or to insert filters in position, is inconvenience to the user of a projector.

The object of the present invention is to provide means positioned in the path of light rays through the projector and effective to change the path of the light rays, to eliminate the aforementioned defects with respect to color projection, and to do this in a manner much simpler than is possible with the use of interchangeable or removable filters. In accordance with the present invention, there is provided, in a slide projector having filters for changing the reproduction of colors, a glass filter which is built into the projector and which has filter layers or coatings on one or both light transmission faces. This glass filter is located in the path of the light rays from the projecting bulb to the slide holder, and is so mounted that it is angularly adjustable about an axis which is perpendicular to the optical axis of the projector light rays and preferably parallel to the light-entry and exit surfaces of the glass filter.

Particularly advantageous results are obtained if the aforementioned glass filter is positioned in the path of light rays passing between two condenser lenses. A glass filter having interference layers will then, as a function of its angular position, change the color of the projected rays through a wide range. It is thus possible not only to eliminate the "cold-light" effect mentioned above, but it is further possible to correct the colors of a slide having the wrong color values.

As a feature of the invention, the glass filter may be provided with a surface coating of adjacent layers of different filtering effects, and which are deposited in such a manner that they form a continuous surface. In such a case, a continuous change of the color of the projected rays is obtained even when the glass filter is not located in the telecentric path of the light rays and even when it is not supported in an angularly adjustable manner.

Further advantages of the invention arrangements are obtained when the glass filter is used further as a heat protector for the illuminating system. In such case, the heat filter which is already provided in the illuminating system can, in a known manner, such as by vacuum deposition, have one or both surfaces coated with a filter coating or coatings.

For an understanding of the principles of the invention, reference is made to the following description of typical embodiments thereof, of which one embodiment is illustrated in the accompanying drawing. In the drawing, the single figure is a side elevational view, partly broken away in vertical section, through a slide projector embodying the invention.

Referring to the drawing, the light rays from a projector lamp bulb 1 pass, in a known manner, through a two-part condenser consisting of the aspherical lenses 2 and 3. Between lenses 2 and 3 there is located, in a manner known per se, a heat protecting glass disk 4. In accordance with the principles of the present invention, an interference layer or coating is vacuum deposited on one or both light transmission surfaces of disk 4.

Disk 4 can be angularly adjusted about the axis of a mounting shaft 5, extending diametrically of the support means for disk 4, merely by turning the adjusting knob 9 connected to shaft 5. Only small angular adjustments are necessary, and the broken lines indicate the limits of angular adjustment of disk 4.

The slide to be projected is positioned in the slide holder 6, and projection onto a screen, which is not shown, is effected in the usual manner by means of an objective 7. A known concave mirror 8 reinforces and intensifies the light from the projector lamp bulb 1.

As previously mentioned, an interference layer is vacuum deposited on heat filter 4. This interference layer is a multiple layer consisting, in a known manner of $\lambda/4$ layers which alternately have high and low refractive indices. In order to increase this effect, both sides of the heat filter 4 can be coated with such interference layers.

Coatings for correcting color values can be additionally deposited on one or both surfaces of lens 2, of lens 3, or of both lenses 2 and 3, or as a special coating on the reflecting surface of concave mirror 8. The components 2, 3, 4 and 8, or any one or more thereof, can be, as shown in the drawing, positioned in holders mounted in the projector in such a manner that they can be easily changed or interchanged. Thereby it is possible to change optical components having coatings with optical components not having coatings, or to change optical components having one type of coating with optical components having other types of coatings.

In projectors which are built for exclusive use with low voltage bulbs having a high color temperature, it is further within the purview of the invention to coat one or both surfaces of lenses in objective 7 with filter coatings, similar to those previously described.

While specific embodiments of the invention have been shown and/or described in detail to illustrate the application of the principles of the invention, it will be understood that the invention may be embodied otherwise without departing from such principles.

What is claimed is:

1. A slide projector comprising, in combination, a projector lamp bulb; a slide holder; an optical projection system in operative association with said bulb and said slide holder, and positioned along the optical axis of the projector; a glass filter having at least one surface coated with an interference filtering layer; and means mounting said glass filter between said bulb and said slide holder for angular adjustment about an axis substantially parallel to its light-entry and exit surfaces and substantially perpendicular to said optical axis.

2. A slide projector, as claimed in claim 1, in which said optical projection system includes a pair of axially spaced condenser lenses; said glass filter being positioned in the telecentric path of light rays between said two condenser lenses.

3. A slide projector, as claimed in claim 1, said mounting means including a holder for said glass filter and a shaft extending diametrically of said holder and provided with a manual operation knob for angular adjustment of said shaft.

4. A slide projector, as claimed in claim 1, in which said filtering layer is subdivided into plural adjacent layers of different filter materials forming a continuous coating layer.

5. A slide projector, as claimed in claim 1, said glass filter being constructed and arranged as a heat protector for said optical projection system.

6. A slide projector, as claimed in claim 1, in which said glass filter has both of its surfaces coated with filtering layers.

7. A slide projector, as claimed in claim 1, said optical projection system including at least one component having a light transmission surface coated with a filtering layer.

References Cited by the Examiner
UNITED STATES PATENTS

| | | | |
|---|---|---|---|
| 1,434,268 | 10/1922 | Tillyer | 88—24 |
| 2,552,184 | 5/1951 | Koch | 88—24 |
| 2,637,242 | 5/1953 | Osterberg et al. | 88—24 |
| 2,742,837 | 4/1956 | Streiffert | 88—24 X |
| 3,085,468 | 4/1963 | Hohn | 88—24 |

NORTON ANSHER, *Primary Examiner.*

H. H. FLANDERS, *Examiner.*